United States Patent [19]

Wommelsdorf

[11] 4,092,201

[45] May 30, 1978

[54] PROCESS AND APPARATUS FOR COATING AN AIR-PERMEABLE CONTAINER WITH A FOIL OF THERMOPLASTIC MATERIAL

[75] Inventor: Fritz Wommelsdorf, Hamburg, Germany

[73] Assignee: Maschinenfabrik Rissen GmbH, Hamburg, Germany

[21] Appl. No.: 735,775

[22] Filed: Oct. 26, 1976

[30] Foreign Application Priority Data

Oct. 23, 1975 Germany .................... 2547477

[51] Int. Cl.² .................... B32B 27/10; B65D 5/56
[52] U.S. Cl. .................... 156/285; 156/287; 156/311; 156/382; 229/1.5 B; 264/268
[58] Field of Search .......... 156/84, 87, 156, 285, 156/286, 287, 293, 294, 306, 311, 322, 381, 382, 494, 498, 499, 556, 475; 264/209, 259, 269, 268, 101, 102; 229/1.5 B; 211/125

[56] References Cited

U.S. PATENT DOCUMENTS

| | | | |
|---|---|---|---|
| 2,509,439 | 5/1950 | Langer | 156/311 |
| 2,559,573 | 7/1951 | Unwin | 211/125 |
| 2,736,065 | 2/1956 | Wilcox | 156/287 |
| 2,891,280 | 6/1959 | Politis | 229/1.5 B |
| 3,134,307 | 5/1964 | Loeser | 156/311 |
| 3,528,865 | 9/1970 | Amberg et al. | 156/287 |
| 3,697,369 | 10/1972 | Amberg et al. | 156/285 |
| 3,933,562 | 1/1976 | Cruckshank et al. | 156/287 |
| 3,957,558 | 5/1976 | Lee et al. | 156/287 |

*Primary Examiner*—David Klein
*Assistant Examiner*—John E. Kittle
*Attorney, Agent, or Firm*—Arnold, White & Durkee

[57] ABSTRACT

A process for lining an air-permeable container, such as a paper cup, with a thermoplastic foil by directing a warm pressurized stream of gas to press the foil into place and varying either the flow rate or temperature of the gas stream or both to guarantee the foil shape within the container while it is thus controllably cooled and solidified. The apparatus includes a controllable discharge valve, such as a relief valve formed at the edge of a spring loaded cover through which gas is supplied, for allowing a faster gas flow for cooling than used for deep drawing the foil. Either one or two gas supplies may be used. In the case of two, the gas supply for cooling is at a higher pressure than that used for deep drawing and is preferably at a lower temperature.

8 Claims, 1 Drawing Figure

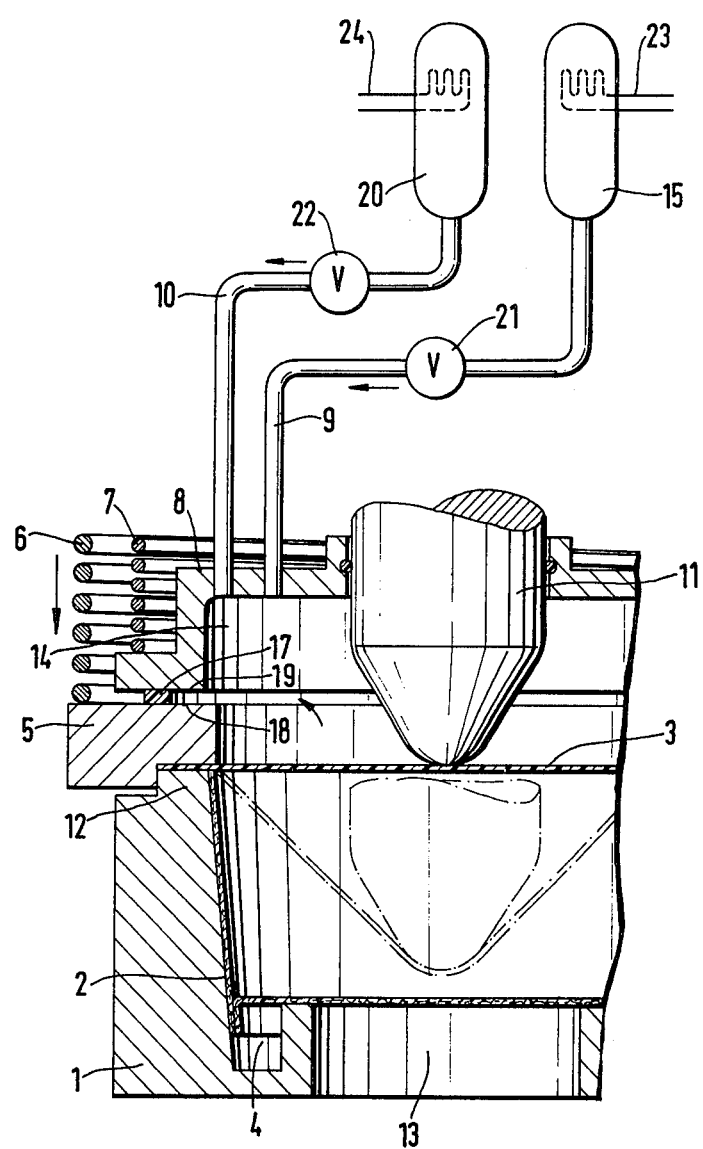

PROCESS AND APPARATUS FOR COATING AN AIR-PERMEABLE CONTAINER WITH A FOIL OF THERMOPLASTIC MATERIAL

BACKGROUND OF THE INVENTION

1. Field of the Invention

This invention pertains to the coating of air-permeable containers with a foil of thermoplastic material.

2. Description of the Prior Art

It is known in the prior art how to coat air-permeable containers, e.g., paper cups, with a foil of thermoplastic material using the following procedure: the container to be coated is placed in a deep-drawing mold; the foil is stretched in a hot plastic condition over the container opening; a differential pressure is then applied to the foil (low pressure from the side of the container or excess pressure from a source, through a cover, arranged over or above the foil and mold opening) to deep draw the foil into the container; and the foil is allowed to solidify in contact with the inner surface of the container. The above-described procedure works suitably well in applications where there are appreciable time intervals to permit suitable softening and then solidifying of the foil and where the applied differential pressure does not have to be too great while the foil is in its heated and soft condition.

Difficulties arise, however, using the above-described prior art procedure to process very thin foils, which would require processing within a very narrow range of temperatures, which would require very close limits on the amount of pressure differential to be applied, and which would require long periods of time for each container coating operation, thereby making it impractical to consider high machine speeds normally associated with mass production.

Further, even with very close and carefull control, processing such foils with a low pressure acting from only the underside of the container is often not sufficient to accomplish deep drawing. Therefore, instead of or in addition to creating a low-pressure vacuum condition, it becomes necessary to apply compressed air from the other side. To prevent this compressed air from quickly cooling the foil below the prescribed deep-drawing temperature, the air must be pre-heated or warmed. Accordingly, in this warm air environment, the foil does not solidify in its deep-drawn shape because it has no way of emitting heat to the surrounding air. The porous walls of the container do conduct some heat from the foil, but they do so slowly and inefficiently, since the only means of heat conduction from the container walls, other than to the heated air, is to the walls of the mold. It is evident that such slow cooling is incompatible with short-phase operation of high speed machines. Typically, the deep-drawing occurrences in the foil coating of 100 containers per minute, would each last for about one-half second, only part of which is available for the cooling of the foil in the deep-drawn condition. Should a mold be opened before the foil is completely solidified in the desired shape, it is possible that the inherent residual forces would re-shape the foil, particcularly in the concave corner ranges of the porous container. Thus, the finished product would not have foil completely fitting into these corners.

Therefore, it is a feature of this invention to provide an improved coating process for an air-permeable container, especially a paper cup, which presses a foil of thermoplastic material in the hot-plastic condition into the container through the use of a stream of gas under pressure, the pressure being greater than atmospheric on the open side of the container, which gas stream is then cooled until the foil is solidified in place in the container.

It is another feature of this invention to provide an improved process for deep drawing a foil into an air-permeable container and solidifying it in place so that it substantially completely fits the corners of the container into which it has been drawn as a coating.

SUMMARY OF THE INVENTION

According to the process invention hereof, the advantages set forth above are achieved by supplying a stream of gas under pressure exceeding atmospheric pressure in two subsequent phases. The first phase lasts at least until the foil completely fits the container. During this phase the gas temperature and the amount of gas are such that the foil does not try to solidify prematurely. In the second phase, the gas is supplied at a sufficiently high pressure to guarantee the shape of the foil. The gas may also be at a cooler temperature, to permit the foil to cool until it is solidified.

It is appropriate to limit the amount of gas in the first phase to the amount required to press the foil to the container without rupture or distortion of the foil, whereas in the second phase, a substantially greater amount of gas may be allowed to rinse through to quickly cool the foil. The foil is not as susceptible to damage by the faster gas flow since it is now supported by the container. It is possible to use a warmed gas in the first phase; whereas, a cooled gas may be used in the second phase. However, it is also possible in some cases to use a gas of the same temperature for both phases. The reason for this is that in the first phase, only a small amount of gas acts on the foil and the cooling effect thereof can be controllably limited to keep the foil sufficiently plastic at the required temperature until its final shape is determined. The rinsing in the second phase is at an increased volume, so that cooling is effected for solidifying the foil even though the temperature remains the same.

The invention also relates to improving apparatus for coating air-permeable containers, such as paper cups, by deep-drawing foils of thermoplastic material therein. Such standard apparatus comprises a mold for accommodating the container to be coated, a clamping device for fastening the foil to be deep drawn at the edge of the mold, a cover for covering the mold and the foil and closely adaptable thereto, means for connecting the interior of the mold to expose the external side of the container, normally opposite the bottom, to a gas pressure normally not exceeding atmospheric pressure, and means for connecting the interior of the cover with a source of pressure in excess of atmospheric pressure.

Such standard apparatus may be improved so that it may be operated in such a way so as to achieve satisfactory foil coating of the containers with which it is employed even when the foil blanks are quite thin and the apparatus is part of mass production machine. According to this invention, this is achieved by connecting the interior of the cover to a controlled discharge valve. This valve is first closed and then opened at predetermined times to connect the interior of the cover to the source of excess pressure in the manner previously discussed. For example, the apparatus works in such a manner that after the initial closing of the deep-drawing mold, a first compressed gas condition is introduced through the valve into the interior of the cover which sufficiently deep draws the foil. Next a pressure is introduced through the valve which is higher than the deep drawing pressure. This may be achieved by a further opening of the valve or by increasing the gas pressure to the valve. In either event, the pressure causes a streaming of compressed gas which secures the foil shape and rinses it as it cools and solidifies. Only thereafter is the source of compressed gas switched off and the mold opened.

A sufficient pressure in the interior of the cover during the rinsing phase is guaranteed by providing the valving entrance for the compressed gas into the interior of the cover with a larger cross-sectional dimension than the exit dimension for the compressed gas from the interior of the container. The exit dimension may be controlled by a discharge valve and may be controlled dependent on pressure or time.

A particularly simple example of suitable discharge valving is obtained by using a relief valve. Such a relief valve is set for opening at a pressure below the pressure of the source of excess pressure and above the pressure required for the complete pressing of the foil to the container to be cooled (i.e., the pressure used during the rinsing phase). Such a relief valve can only open as soon as the pressure required for the deep drawing has been exceeded in the interior of the container. This guarantees that the deep drawing operation is finished before the opening of the discharge valve to accommodate the greater air flow for the rinsing phase. Moreover, it is a property of such a relief valve that it remains open only so long as the relatively high pressure is applied. Hence, this ensures that in the second phase of operation, the rinsing phase, the compressed gas streams through the container coated with the foil at a pressure in excess of the deep-drawing pressure so as to keep the foil in its desired position until it solidifies.

It is apparent that such an apparatus may be supplied with a source of compressed gas that delivers a gas flow having a constant temperature for both phases. However, such apparatus may also be connected to two sources of excess pressure, the first of which delivers a relatively warm gas for the first phase and a second which delivers a cooler gas for the rinsing in the second phase. To accomplish switching between first and second sources of excess pressure, means may be employed for such switching functionally operable, for example, dependent on time or pressure, or by the opening movement of a relief valve.

BRIEF DESCRIPTION OF THE DRAWING

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawing, which drawing forms a part of this specification. It is to be noted, however, that the appended drawing illustrates only a typical embodiment of the invention and is therefore not to be considered limiting of its scope, for the invention may admit to other equally effective embodiments.

The single FIGURE illustrated shows a diagram of a sectional view through a preferred embodiment of an apparatus in accordance with the invention herein disclosed for coating paper cups.

DESCRIPTION OF THE PREFERRED EMBODIMENT

The apparatus illustrated is part of a machine, not shown, which comprises a station for supplying foil blanks, a station for warming these blanks, a station for supplying and/or molding paper cups, a deep-drawing station for deep drawing the foil blanks into the paper cups and a discharge station. The figure shows those parts of the deep-drawing station that are necessary to fulfill the tasks according to the invention. These parts are illustrated in axial section, only one half being shown for the sake of simplicity. It should be understood that the other half is symmetrical with the illustrated half.

A mold 1 has an interior area corresponding to the outer shape of paper cup 2 to be coated. The inner surface of the mold supports the inserted paper cup over a large, normally annular area. The relative dimensions of the cup and mold are such as to provide an annular space 4 beneath the cup at its periphery, which space may be used for the application of a gas stream for discharging the cup from the mold when the coating step is completed. The bottom of the mold includes a bore 13 through which the interior of the mold is connected with the atmosphere. In a known manner, a controllable connection with a vacuum may be provided instead.

Above the mold there is a clamping frame 5 which is formed so as to cooperate with upper edge 12 of the mold to clamp the edge of foil blank 3 to be deep drawn. The clamping power is provided by a pressure spring 6, although alternate means could be employed for this purpose.

A cover 8 is provided above clamping frame 5, cover 8 being suitable for close adaptation to clamping frame 5. To achieve suitable sealing therebetween, a gasket 17 may be provided between confronting surfaces 18 and 19, respectively, of clamping frame 5 and cover 8.

Cover 8 is made so that its interior 14 is completely shut off from the atmosphere when the cover is placed upon the clamping frame in the manner illustrated. Cover 8 is provided with a passage for a die 11, this passage also being sealed against the atmosphere. Cover 8 is pressed to clamping frame 5 via a spring 7, the power of which is smaller than that of spring 6. Finally, there are included devices not shown for controllably moving mold 1, clamping frame 5 and cover 8 and possibly die 11 relative to each other. Such devices are known and need not be described more fully.

Cover 8 is provided with two conduit connections 9 and 10 to two sources of excess pressure. These sources of excess pressure are indicated in the drawing as pressure tanks 15 and 20, respectively. Controlling valves 21 and 22 located respectively in conduit connections 9 and 10, permit the connection of compressed air or other gas from tanks 15 and 20, respectively, in phases, in the manner to be described. In addition, heating or cooling devices 23 and 24 located adjacent tanks 15 and 20, respectively, are provided to impart the compressed gas passing from these two sources to the mold in predetermined desirable temperature ranges.

The illustrated apparatus is operated as follows: a paper cup 2 to be coated is inserted into mold 1. A hot plastic foil or foil blank 3 is clamped between edge 12 of the mold and clamping frame 5, it being first stretched in an approximate hrizontal shape. Cover 8 is then closed. Die 11 moves downward into the position shown by dot-and-dash lines, in order to predraw the foil. Valve 21 is then opened to create in space 14 above foil 3 an excess pressure compared to that of the atmosphere. This excess pressure is sufficiently great that it causes the hot plastic foil to be pressed against the inner surface of the paper cup to be coated into the desired position. The gas introduced into the interior of cover 8 for this purpose through conduit 9 from tank 15 is at such a temperature, resulting from heating device 23, that the foil is not cooled so as to become non-plastic during this deep-drawing procedure. Subsequently, valve 22 in conduit 10 to tank 20 is opened. This permits gas from tank 20 of a lower temperature than that in container 15 to be supplied to cover 8. Temperature in gas 20 is determined by device 24. Simultaneously or shortly thereafter, valve 21 may be closed. However, it may also remain open. The pressure in tank 20 is sufficiently great that the pressure in interior 14 quickly reaches the quotient of the power of spring 7 in the area encircled by gasket 17. When the pressure further increases, cover 8 raises against the power of spring 7 so as to form an opening between surfaces 18 and 19 and gasket 17, respectively, through which gas escapes. Accordingly, a rinsing stream of cool gas is formed from pressure tank 20 through conduit 10 and through interior 14 to the opening formed between surfaces 18 and 19. This rinsing stream passes by the foil fitting paper cup 2 in the deep-drawn position and cools it. The stream is maintained until the foil is frozen or solidified in the desired position. Under the influence of spring 7, a pressure is constantly maintained in interior 14 which guarantees a complete fitting of the foil to the paper cup during this rinsing phase. The phase operations just described occur very quickly, for instance, within fractions of a second.

In this procedure, the opening of valve 22, and if necessary, the closure of valve 21, can be controlled externally dependent on time or pressure. It is also possible to utilize the lifting movement of cover 8 under the pressure of space 14 to create a controlled impulse for such purpose. In this latter case, pressure source 15 must first establish a sufficient increase in pressure in interior space 14 to initiate the lifting of cover 8.

Alternatively, apparatus in accordance with the present invention may also be operated with only one pressure source, if the gas of this pressure source is at a temperature sufficiently small so that a relatively small amount of gas penetrating into space 14 during the deep drawing step will not effect a considerable cooling of the foil. The gas amount subsequently passing during the rinsing phase must then be sufficient for an interchange of heat with the foil to effect cooling.

It is obvious that it is possible to use only a part of cover 8 as a relief valve or to use a separate device altogether for this purpose. Likewise, a mechanically operating valve may be provided which is controlled depending upon time or pressure.

While a particular embodiment of the invention has been shown, it will be understood that the invention is not limited thereto, since many modifications may be made and will become apparent to those skilled in the art.

What is claimed is:

1. A process for coating an air-permeable container with a hot plastic foil of thermoplastic material and coolingly solidifying the foil in place, which comprises the steps of:

directing against the foil a drawing stream of gas at a pressure in excess of the atmospheric pressure external to the container,
   said stream of gas being at a pressure sufficient to press the foil in its hot plastic condition into the container until the foil completely fits the container and being at a flow rate and temperature which prevent said foil from solidifying; and
   directing against the foil a cooling stream of gas at a pressure in excess of the atmospheric pressure external to the container, said stream of gas being at a pressure sufficient to guarantee the shape of the foil and being at a flow rate and temperature sufficient to cool and solidify the foil.

2. A process in accordance with claim 1, wherein the drawing stream of gas is warmer than the cooling stream of gas.

3. A process in accordance with claim 1, wherein the flow rate of said drawing stream of gas is limited to apply only enough pressure for pressing the foil into the container and wherein the flow rate of said cooling stream of gas is substantially greater.

4. A process in accordance with claim 3, wherein the drawing and cooling streams of gas are at the same temperature.

5. A process in accordance with claim 3, wherein the cooling stream of gas is cooled.

6. Apparatus for coating air-permeable containers with deep-drawn foils of thermoplastic material, comprising a mold adapted to receive a container to be coated,
   a clamp for securing a foil blank on the edge of said mold in position for being deep-drawn into the container,
   a cover for tightly closing over said mold and foil blank,
   said mold including a passage connecting the external side of the container with a source of no more than atmospheric pressure,
   a source of gas pressurized in excess of atmospheric pressure,
   supply means for connecting said source to the interior of said cover for deep-drawing said foil blank into the container, and
   a normally-closed discharge valve connected to the interior of said cover and delay-controllably opened following a supply of gas from said source to the interior of said cover,
   said discharge valve including a relief valve which opens at a relief pressure which is below the pressure of said pressurized gas and above the pressure required for the deep-drawing of said foil blank into said container.

7. Apparatus in accordance with claim 6, wherein said relief valve includes
   at least part of the mating parts between said cover and said mold and
   spring means for closing said cover and said mold, said spring means being overcome at said relief pressure.

8. Apparatus for coating air-permeable containers with deep-drawn foils of thermoplastic material, comprising
   a mold adapted to receive a container to be coated,
   a clamp for securing a foil blank on the edge of said mold in position for being deep drawn into the container,
   a cover for tightly closing over said mold and foil said mold including a passage connecting the external side of the container with a source of no more than atmospheric pressure, a first source of gas pressurized in excess of atmospheric pressure, first supply means for connecting said first source to the interior of said cover for deep drawing said foil blank into the container, a second source of gas pressurized in excess of the gas of said first source and cooler than the gas of said first source, second supply means for connecting said second source to the interior of said cover after said first supply means connects said first source thereto, and a normally-closed discharge valve connected to the interior of that cover and delay-controllably opened following a supply of gas from said second source to the interior of the cover, said discharge valve including a relief valve which opens at a relief pressure below the pressure of the pressurized gas of said second source of gas and above the pressure required for the complete deep-drawing of the foil blank into the container.

* * * * *